US009448993B1

(12) United States Patent
Braga et al.

(10) Patent No.: US 9,448,993 B1
(45) Date of Patent: Sep. 20, 2016

(54) SYSTEM AND METHOD OF RECORDING UTTERANCES USING UNMANAGED CROWDS FOR NATURAL LANGUAGE PROCESSING

(71) Applicant: VOICEBOX TECHNOLOGIES CORPORATION, Bellevue, WA (US)

(72) Inventors: Daniela Braga, Bellevue, WA (US); Spencer John Rothwell, Seattle, WA (US); Faraz Romani, Renton, WA (US); Ahmad Khamis Elshenawy, Lynnwood, WA (US); Stephen Steele Carter, Seattle, WA (US); Michael Kennewick, Bellevue, WA (US)

(73) Assignee: VoiceBox Technologies Corporation, Bellevue, WA (US)

( * ) Notice: Subject to any disclaimer, the term of this patent is extended or adjusted under 35 U.S.C. 154(b) by 0 days.

(21) Appl. No.: 14/846,926

(22) Filed: Sep. 7, 2015

(51) Int. Cl.
| | |
|---|---|
| *G10L 15/26* | (2006.01) |
| *G06F 17/27* | (2006.01) |
| *G10L 15/06* | (2013.01) |
| *G10L 15/18* | (2013.01) |
| *G10L 15/22* | (2006.01) |

(52) U.S. Cl.
CPC .......... *G06F 17/278* (2013.01); *G06F 17/277* (2013.01); *G10L 15/063* (2013.01); *G10L 15/1822* (2013.01); *G10L 15/22* (2013.01); *G10L 15/26* (2013.01); *G10L 2015/0633* (2013.01); *G10L 2015/0638* (2013.01)

(58) Field of Classification Search
CPC ....................................................... G10L 15/34
See application file for complete search history.

(56) References Cited

U.S. PATENT DOCUMENTS

| | | | |
|---|---|---|---|
| 7,197,459 B1 * | 3/2007 | Harinarayan .. | G06Q 10/063112 704/270 |
| 7,966,180 B2 | 6/2011 | Bajaj | |
| 8,805,110 B2 | 8/2014 | Rhoads | |
| 8,847,514 B1 | 9/2014 | Reynoso | |
| 8,849,259 B2 | 9/2014 | Rhoads | |
| 8,855,712 B2 | 10/2014 | Lord | |
| 8,886,206 B2 | 11/2014 | Lord | |
| 8,925,057 B1 | 12/2014 | Ansari | |

(Continued)

OTHER PUBLICATIONS

Callison-Burch, Chris, and Mark Dredze. "Creating speech and language data with Amazon's Mechanical Turk." Proceedings of the NAACL HLT 2010 Workshop on Creating Speech and Language Data with Amazon's Mechanical Turk. Association for Computational Linguistics, 2010.*

(Continued)

*Primary Examiner* — Brian Albertalli
(74) *Attorney, Agent, or Firm* — Sheppard Mullin Richter & Hampton LLP

(57) ABSTRACT

A system and method of recording utterances for building Named Entity Recognition ("NER") models, which are used to build dialog systems in which a computer listens and responds to human voice dialog. Utterances to be uttered may be provided to users through their mobile devices, which may record the user uttering (e.g., verbalizing, speaking, etc.) the utterances and upload the recording to a computer for processing. The use of the user's mobile device, which is programmed with an utterance collection application (e.g., configured as a mobile app), facilitates the use of crowd-sourcing human intelligence tasking for widespread collection of utterances from a population of users. As such, obtaining large datasets for building NER models may be facilitated by the system and method disclosed herein.

20 Claims, 6 Drawing Sheets

(56) References Cited

U.S. PATENT DOCUMENTS

| | | | |
|---|---|---|---|
| 8,929,877 B2 | 1/2015 | Rhoads | |
| 9,008,724 B2 | 4/2015 | Lord | |
| 9,047,614 B2 | 6/2015 | Kalikivayi | |
| 2004/0093220 A1 | 5/2004 | Kirby | |
| 2007/0265971 A1 | 11/2007 | Smalley | |
| 2009/0150983 A1 | 6/2009 | Saxena | |
| 2012/0066773 A1 | 3/2012 | Weisberger | |
| 2012/0254971 A1 | 10/2012 | Hu | |
| 2013/0231917 A1* | 9/2013 | Naik | G10L 13/08 704/9 |
| 2013/0262114 A1* | 10/2013 | Brockett | G10L 15/22 704/243 |
| 2014/0156259 A1* | 6/2014 | Dolan | G06F 17/28 704/9 |
| 2014/0196133 A1 | 7/2014 | Shuster | |
| 2014/0244254 A1* | 8/2014 | Ju | G10L 15/063 704/243 |
| 2015/0006178 A1* | 1/2015 | Peng | G10L 15/18 704/254 |
| 2015/0095031 A1* | 4/2015 | Conkie | G10L 15/187 704/254 |
| 2015/0120723 A1 | 4/2015 | Deshmukh | |
| 2015/0278749 A1 | 10/2015 | Bhagat | |
| 2015/0339940 A1 | 11/2015 | Aggarwal | |

OTHER PUBLICATIONS

McGraw, Ian, et al. "Collecting Voices from the Cloud." LREC. 2010.*

Liu, Sean, Stephanie Seneff, and James Glass. "A collective data generation method for speech language models." Spoken Language Technology Workshop (SLT), 2010 IEEE. IEEE, 2010.*

Freitas, João, et al. "Crowdsourcing platform for large-scale speech data collection." Proc. FALA (2010).*

Suzić, Siniša, Darko Pekar, and Vlado Delić. "On the Realization of AnSpeechCollector, System for Creating Transcribed Speech Database."*

McGraw, Ian Carmichael. Crowd-supervised training of spoken language systems. Diss. Massachusetts Institute of Technology, 2012.*

Hughes, Thad, et al. "Building transcribed speech corpora quickly and cheaply for many languages." INTERSPEECH. 2010.*

Badenhorst, Jaco, Alta de Waal, and Febe de Wet. "Quality measurements for mobile data collection in the developing world." SLTU. 2012.*

De Vries, Nic J., et al. "A smartphone-based ASR data collection tool for under-resourced languages." Speech communication 56 (2014): 119-131.*

Amazon, "Amazon Mechanical Turk Getting Started Guide", API Version Mar. 25, 2012, available at: http://awsdocs.s3.amazonaws.com/MechTurk/20120325/amt-gsg-20120325.pdf.*

Amazon, "Amazon Mechanical Turk Requester UI Guide", API Version Mar. 25, 2012, available at: http://awsdocs.s3.amazonaws.com/MechTurk/20120325/amt-ui-20120325.pdf.*

Amazon, "Amazon Mechanical Turk Developer Guide", API Version Mar. 25, 2012, available at: http://awsdocs.s3.amazonaws.com/MechTurk/20120325/amt-dgi-20120325.pdf.*

Amazon, "Amazon Mechanical Turk API Reference", API Version Mar. 25, 2012, available at: http://awsdocs.s3.amazonaws.com/MechTurk/20120325/amt-API-20120325.pdf.*

McGraw, "Collecting Speech from Crowds", from "Crowdsourcing for Speech Processing: Applications to Data Collection, Transcription, and Assessment", Chapter 3, pp. 37-71, John Wiley & Sons, 2013.*

McGraw and Polifroni, "How to Control and Utilize Crowd-Collected Speech", from "Crowdsourcing for Speech Processing: Applications to Data Collection, Transcription, and Assessment", Chapter 5, pp. 106-136, John Wiley & Sons, 2013.*

Draxler, "Interfaces for Crowdsourcing Platforms", from "Crowdsourcing for Speech Processing: Applications to Data Collection, Transcription, and Assessment", Chapter 9, pp. 241-278, John Wiley & Sons, 2013.*

Bontcheva, Kalina, et al. "Crowdsourcing Named Entity Recognition and Entity Linking Corpora", Handbook of Linguistic Annotation, Springer, 2014, 18 pages.

Braunschweig, Katrin, et al., "Enhancing Named Entity Extraction by Effectively Incorporating the Crowd", BTW Workshops, 2013, pp. 181-195.

Buchholz, Sabine, et al., "Crowdsourcing Preference Tests, and How to Detect Cheating", in INTERSPEECH 2011, 8 pages.

Carmel, David, et al., "ERD\14: Entity Recognition and Disambiguation Challenge", ACM SIGIR Forum, vol. 48, No. 2, 2014, pp. 63-77.

Derczynski, Leon, et al., "Analysis of Named Entity Recognition and Linking for Tweets", Information Processing & Management, vol. 51, No. 2, 2015, pp. 32-49.

Eickhoff, C. et al., "Increasing Cheat Robustness of Crowdsourcing Tasks", Information Retrieval, vol. 16, No. 2, 2013, 18 pages.

Eickhoff, Carsten, "How Crowdsourcable is Your Task?", Proceedings of the Workshop on Crowdsourcing for Search and Data Mining, Feb. 9, 2011, pp. 11-14.

Finin, Tim, et al., "Annotating Named Entities in Twitter Data With Crowdsourcing", Proceedings of the NAACL HLT 2010 Workshop on Creating Speech and Language Data With Amazon \s Mechanical Turk, Association for Computational Linguistics, Jun. 2010, pp. 80-88.

Gadiraju, Ujwal, et al., "Understanding Malicious Behavior in Crowdsourcing Platforms: The Case of Online Surveys", CHI 2015—Conference on Human Factors in Computing Systems, Seoul, South Korea, Apr. 18, 2015, 10 pages.

Gennaro, Rosario, et al., "Non-Interactive Verifiable Computing: Outsourcing Computation to Untrusted Workers", Advances in Cryptology-CRYPTO 2010, Springer Berlin Heidelberg, 2010, 19 pages.

Hsueh, Pei-Yun, et al., "Data Quality from Crowdsourcing: A Study of Annotation Selection Criteria", Proceedings of the NAACL HLT Workshop on Active Learning for Natural Language Processing, Boulder, Colorado, Jun. 2009, pp. 27-35.

Ipeirotis, Panagiotis G., "Quality Management on Amazon Mechanical Turk", Proceedings of the ACM SIGKDD Workshop on Human Computation, ACM, Jul. 2010, pp. 64-67.

Kaufmann, Nicolas, et al., "More Than Fun and Money. Worker Motivation in Crowdsourcing—A Study on Mechanical Turk", Proceedings of the Seventeenth Americas Conference on Information Systems, AMCIS, vol. 11, Aug. 4, 2011, pp. 1-11.

Lawson, Nolan, et al., "Annotation Large Email Datasets for Named Entity Recognition with Mechanical Turk", Proceedings of the NAACL HLT 2010 Workshop on Creating Speech and Language Data With Amazon\s Mechanical Turk, Association for Computational Linguistics, Jun. 2010, pp. 71-79.

Levenshtein, V., I., Binary Codes Capable of Correcting Deletions, Insertions, and Reversals, Soviet Physics-Doklady, vol. 10, No. 8, Feb. 1966, pp. 707-710.

Oleson, David, et al., "Programmatic Gold: Targeted and Scalable Quality Assurance in Crowdsourcing", Human Computation, Papers from the 2011 AAAI Workshop (WS-11-11), vol. 11, 2011, 6 pages.

Rutherford, Attapol T., et al., "Pronunciation Learning for Named-Entities Through Crowd-Sourcing", Proceedings of the 15th Annual Conference on the International Speech Communication Association, 2015, 5 pages.

Sabou, M. et al., "Crowdsourcing Research Opportunities: Lessons from Natural Language Processing", iKnow 2012—Proceedings of the 12th International Conference on Knowledge Management and Knowledge Technologies, Graz, Austria, Article 17, Sep. 5, 2012, 8 pages.

Sabou, Marta, et al., "Corpus Annotation through Crowdsourcing: Towards Best Practice Guidelines", Proceedings of the 9th International Conference on Language Resources and Evaluation, Reykjavik, Iceland, 2014, 8 pages.

(56) References Cited

OTHER PUBLICATIONS

Soleymani, Mohammad, et al., "Crowdsourcing for Affective Annotation of Video: Development of a Viewer-Reported Boredom Corpus", Proceedings of the ACM SIGIR 2010 Workshop on Crowdsourcing for Search Evaluation, Jul. 19, 2010, pp. 4-8.

Voyer, Robert, et al., "A Hybrid Model for Annotating Named Entity Training Corpora", Proceedings of the Fourth Linguistic Annotation Workshop, Association for Computational Linguistics, Jul. 15, 2010, pp. 243-246.

Wang, Gang, et al., Serf and Turf: Crowdturfing for Fun and Profit, Proceedings of the WWW, New York, Apr. 16, 2012, pp. 679-688.

\* cited by examiner

SYSTEM AND METHOD OF RECORDING UTTERANCES USING UNMANAGED CROWDS FOR NATURAL LANGUAGE PROCESSING

FIELD OF THE INVENTION

The invention relates to a system and method of recording utterances for building Named Entity Recognition ("NER") models, which are used to build dialog systems in which a computer is programmed to listen and respond to human voice dialog, using unmanaged crowds.

BACKGROUND OF THE INVENTION

Many tasks in Natural Language Processing (NLP) require large amounts of annotated or transcribed language data. It is expensive to create and transcribe this data by hand. Costs can be significantly reduced through the use of crowdsourcing to accomplish simple tasks. These cost reductions often come at the price of introducing noise and consequently lowering data quality. The challenge of crowdsourcing is therefore to efficiently filter out the noise introduced by unreliable workers in order to maintain high data quality. These and other drawbacks exist with obtaining large amounts of annotated or transcribed language data for NLP.

SUMMARY OF THE INVENTION

The invention addressing these and other drawbacks relates to a system and method of recording utterances for building NER models, which are used to build dialog systems in which a computer listens and responds to human voice dialog. Utterances to be uttered may be provided to users through their mobile devices, which may record the user uttering (e.g., verbalizing, speaking, etc.) the utterances and upload the recording to a computer for processing. The use of the user's mobile device, which is programmed with an utterance collection application (e.g., configured as a mobile app), facilitates the use of unmanaged crowds for widespread collection of utterances from a population of users. As such, obtaining large datasets for building NER models may be facilitated by the system and method disclosed herein.

To facilitate such widespread collection, a campaign administrator may design a campaign for identifying utterances to be uttered, which may be useful for building NER models. The campaign administrator may also customize campaign configuration parameters that that specify how a campaign should be conducted. Each campaign may be identified by a unique identifier.

In some instances, a campaign may be associated with different sets of utterances to be uttered. For example, a campaign may include a set of session scripts. Each session script may be identified by its own unique session script identifier and may include one or more prompts. A given prompt may be identified by its own prompt identifier and include an utterance to be uttered. Each utterance to be uttered may include one or more words, phrases, and/or other utterance to be uttered. Thus, a given session script may be associated with a set of prompts, which each specify an utterance to be uttered. During a given session, a user may be presented with the set of prompts associated with a session script. As such, a given campaign may be associated with different session scripts, each associated with its set of utterances to be uttered (which may be and typically is different than another session script's set of utterances).

The system may encode information that specifies the campaign identifier and session script identifier in a token. Thus, the campaign and utterances to be uttered are transparent to the user participating in a crowd-sourced task. In an implementation, the system may leverage crowd-sourced services to provide users with tokens.

The system may include a mobile application ("mobile app"), which programs a user's end user device, such as a mobile device, that receives the token and identifies the campaign and utterances to be uttered (e.g., through the session script identifier) based on the token. The mobile app programs the mobile device to obtain the campaign configuration parameters and utterances to be uttered based on the token.

The mobile app may configure itself based on the campaign configuration parameters. For example, to reduce instances of spamming or poor quality responses, a campaign administrator may customize an audit parameter (from among the campaign configuration parameters) to cause the mobile app to configure itself to enable audit checking During such audit checking, the mobile app may determine whether to allow an end user device to participate in recording utterances of a user based on a number of failed audits by the end user device during a given campaign.

The mobile app may audit prompts to ensure that utterances to be uttered are actually uttered by the user. For instance, the mobile app may obtain an edit distance between text recognized from a recorded utterance and text from the utterance to be uttered. If the edit distance is greater than a threshold edit distance, then the audit will be considered to have failed. If a given end user device has failed a maximum number of audits in a given campaign, then the end user device is no longer permitted to participate in the campaign.

In some instances, the campaign administrator may wish for the utterance to be recorded under certain ambient (e.g., background) noise levels. In these instances, the campaign administrator may customize a calibration parameter (from among the campaign configuration parameters) to indicate that a calibration should be performed by the mobile app prior to allowing the user to record the user uttering the utterance. The mobile app may configure itself to perform the calibration based on the calibration parameter. For instance, prior to allowing a user to record the user uttering an utterance, the mobile app may perform a calibration procedure during which ambient noise (e.g., audio without the user uttering an utterance) is measured.

In an implementation, the campaign administrator may wish to obtain recordings in a relatively noise-free environment (e.g., one in which the ambient decibel level does not exceed a maximum level). In these instances, the calibration parameter may specify a maximum allowed ambient decibel level.

In other implementations, the campaign administrator may wish to obtain recordings in a relatively noisy environment (e.g., one in which the ambient decibel level exceeds a minimum level). In these instances, the calibration parameter may specify a minimum ambient decibel level that should be achieved before allowing a recording to occur.

The mobile app may use other campaign configuration parameters to configure itself as well. Once the mobile app has configured itself, and passed any audit checks, calibration checks, etc., the mobile app may display an utterance to be uttered and record the utterance. The mobile app may continue this process until all utterances associated with a given session script identifier has been recorded. A given recording may be uploaded, either immediately after the recording is made, or in a batch process in which multiple recordings are stored and then uploaded, for analysis. In some instances, the users may be compensated for participation in recording the utterances. In these instances, the mobile app may generate and display a completion code, which may be used to validate the session during which the utterance was recorded and compensate the user.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention addressing these and other drawbacks relates to a system and method of recording utterances for building NER models, which are used to build dialog systems in which a computer listens and responds to human voice dialog.

Exemplary System Architecture

Figure 1:
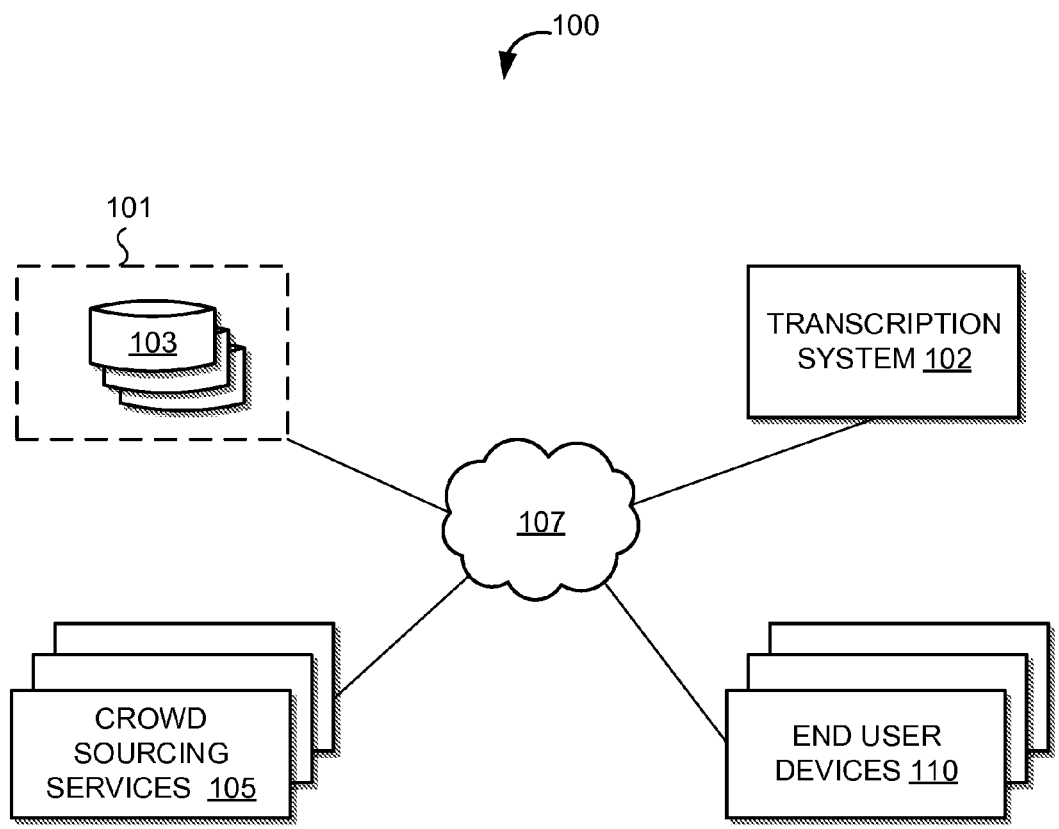
FIG. 1 illustrates a system for recording utterances to be spoken for building NER models, according to an implementation of the invention.

FIG. 1 illustrates a system 100 for recording utterances to be spoken for building NER models, according to an implementation of the invention. In an implementation, system 100 may include a cloud services provider 101, a transcription system 102, a crowd sourcing service 105, one or more end user devices 110, and/or other components. Each component of system 100 may be communicably coupled to one another by one or more computer networks 107.

Transcription system 102 may configure and provide campaigns customized by a campaign manager. An individual campaign may include a single instance of a data collection effort. A campaign may specify a set of utterances to be spoken by users and a set of campaign parameters. In some instances, a given campaign may include different sets of utterances to be uttered by users during different sessions. For example, a given campaign may include a first set of utterances to be uttered by a user during a first session and a second set of utterances to be uttered by the user or other user during a second session different from the first session. In these instances, each set of utterances may be assigned with a session identifier. Thus, a campaign identifier, which identifies a campaign, may be associated with a set of session identifiers, each session identifier identifying a set of utterances to be uttered. In this manner, the system may be used to collect utterances related to words, sounds, or other utterances uttered by users for building NER models. A given campaign manager may use system 100 to configure multiple campaigns, each with its own set of utterances to be uttered by users.

An example of a system that performs the functions of transcription system 102 is described further in co-pending U.S. patent application Ser. No. 14/846,925, filed on Sep. 7, 2015, entitled "SYSTEM AND METHOD FOR PROVIDING WORDS OR PHRASES TO BE UTTERED BY MEMBERS OF A CROWD AND PROCESSING THE UTTERANCES IN CROWD-SOURCED CAMPAIGNS TO FACILITATE SPEECH ANALYSIS," now U.S. Pat. No. 9,361,887, which is incorporated by reference herein in its entirety.

In some instances, some or all campaign information (e.g., campaign parameters, session identifiers, utterances to be spoken, and/or other information that specify the campaign) may be stored using online storage system 103, which may be provided by a cloud services provider 101. Online storage system 103 may include the Amazon S3™ (referred to hereinafter as "S3" in various examples), Microsoft Azure™, Google Drive™, and/or other storage solutions available through a network such as the Internet. Cloud services provider 101 may provide other services, such as computer processing services, as well. In some instances, some or all of the information related to the campaigns may be stored in other storage systems to which transcription system 102 has access.

Wherever the information related to the campaigns is stored, campaigns may be distributed to users via crowd sourcing services 105. Such services may include, for example, Amazon Mechanical Turk™, Crowdflower™, and/or other service that facilitates human intelligence tasks from users who participate in completing predefined tasks, typically, though not necessarily, in exchange for compensation. Campaigns may be distributed to user via alternative or additional channels (e.g. directly from transcription system 102, online marketing, etc.) as well.

Whichever channel is used to distribute a given campaign, transcription system 102 may generate information that specifies the campaign identifier and/or session identifier. The information may be in the form of a token. In a particular implementation, when a campaign is associated with a set of sessions, the token may be configured to identify the campaign and a particular session identifier that identifies a particular set of utterances to be uttered. In this manner, a given token may identify a given campaign and a particular one of its corresponding set of utterances. As such, a token may be used to obtain utterances to be uttered by a user, as well as campaign configurations to be used to conduct collection of the utterances uttered by the user.

Transcription system 102 may cause the information that specifies the campaign identifier and/or session identifier to be provided to users. For example, transcription system 102 may cause a given token to be provided to a user through crowd sourcing services 105, which provides the token to the user via a website or other user interface that displays the token (e.g., displays an alpha-numeric string that is typed into end user device 110 by the user or displays a machine readable code that is imaged and read by the end user device, etc.).

End user device 110 may be programmed to obtain the information based on a campaign identifier. For example, end user device 110 may receive a token and obtain the campaign parameters and utterances to be spoken based on the received token. End user device 110 may then collect the utterances and generate an audio file or other representation of the utterances uttered by the user. Upon completion, end user device 110 may generate a completion code, which is provided to transcription system 102 either directly and/or through crowd sourcing services 105. The completion code may be used to validate the session and compensate the user, flag the utterances associated with the completion code as having been completed by the user, and/or for other purposes as described herein.

Having described a high level overview of the system, attention will now be turned to a more detailed description of end user device 110.

Configuring the Collection Application and Obtaining Utterances

Figure 2:
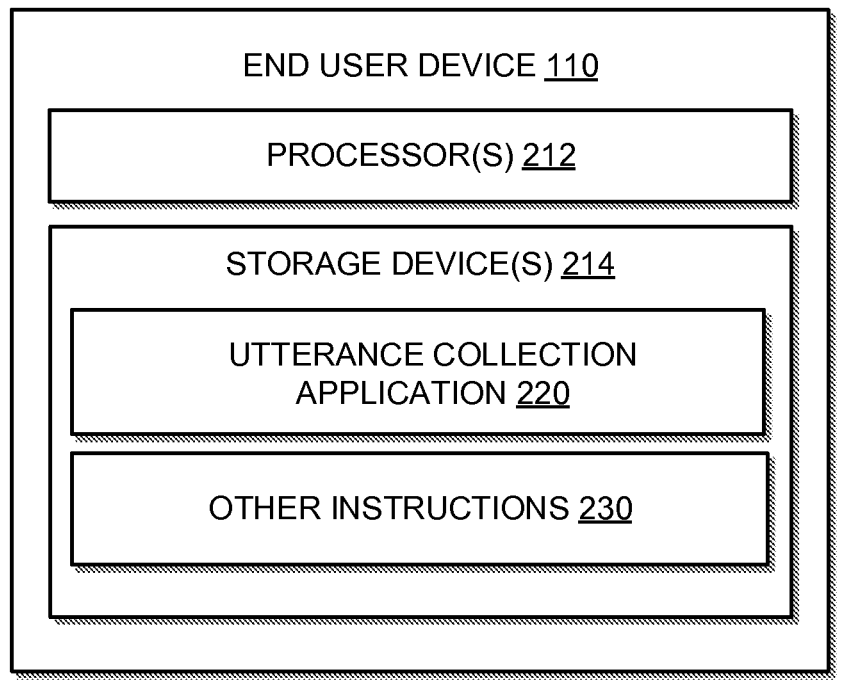
FIG. 2 illustrates an end user device for recording utterances to be spoken for building NER models, according to an implementation of the invention.

FIG. 2 illustrates an end user device 110 for recording utterances to be spoken for building NER models, according to an implementation of the invention. End user device 110 may be configured as a smartphone, a desktop computer, a laptop computer, and/or other device that can be programmed to collect user utterances as described herein.

End user device 110 may include one or more processors 212 (also interchangeably referred to herein as processors 212, processor(s) 212, or processor 212 for convenience), one or more storage devices 214 (which may store various instructions described herein), and/or other components. Processors 212 may be programmed by one or more computer program instructions. For example, processors 212 may be programmed by an utterance collection application 220 and/or other instructions 230 that program end user device 110 to perform various operations. As used herein, for convenience, the various instructions will be described as performing an operation, when, in fact, the various instructions program the processors 212 (and therefore end user device 110) to perform the operation. Utterance collection application 220 may be downloaded from a third party application distributor, such as the Google Play™ store, Apple iTunes™ store, Blackberry World™, and/or other third party application distributors. Alternatively or additionally, utterance collection application 220 may be downloaded directly from transcription system 102 or end user device 110 may be pre-programmed with utterance collection application 220.

Figure 3:
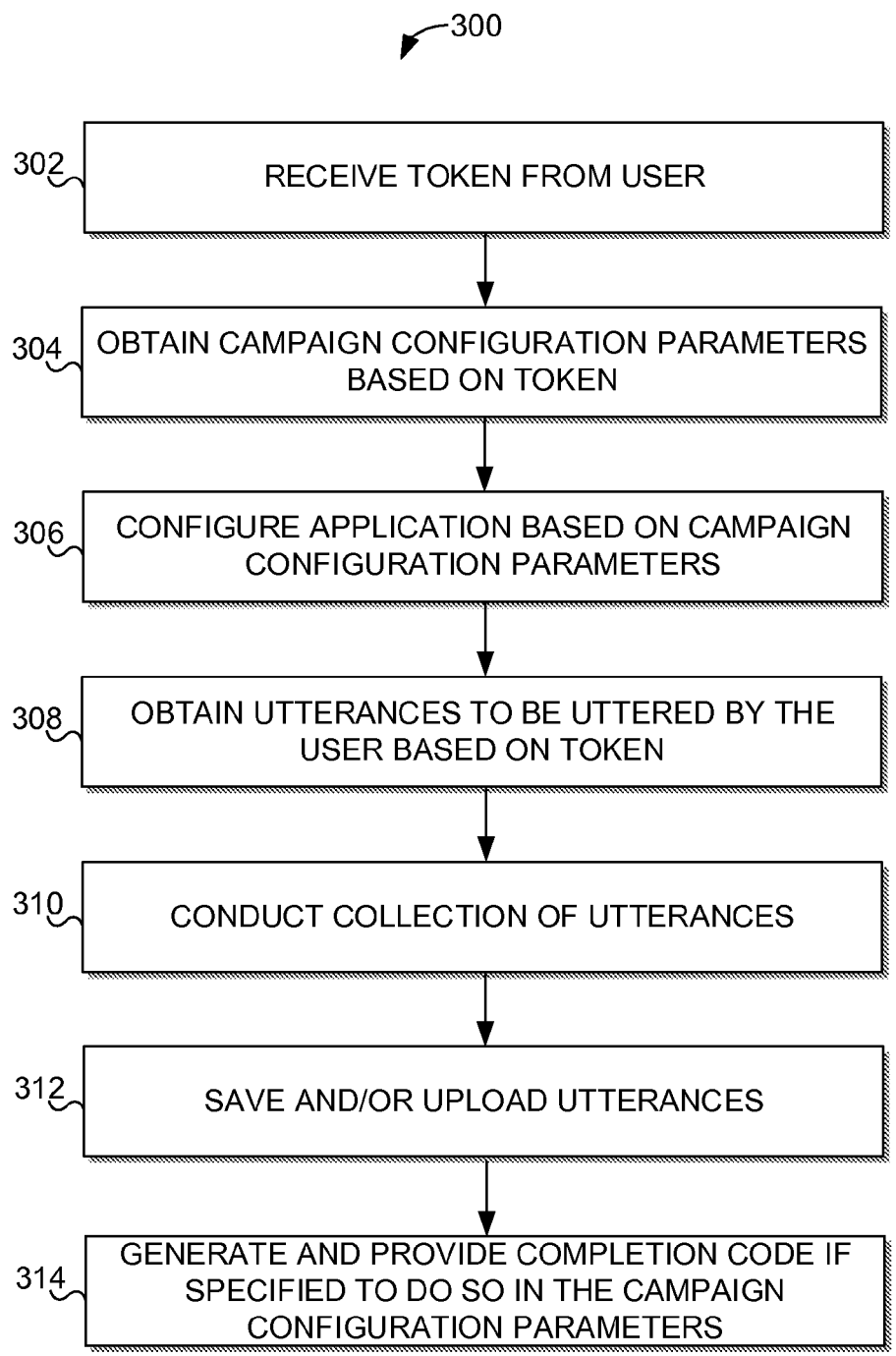
FIG. 3 illustrates a flow diagram of a process of recording utterances to be spoken for building NER models, according to an implementation of the invention.

FIG. 3 illustrates a flow diagram of a process 300 of recording utterances to be spoken for building NER models, according to an implementation of the invention. Process 300 may be implemented by utterance collection application 220 (which programs end user device 110 to perform process 300) or other system component programmed to implement process 300.

Initializing and Configuring the Utterance Collection Application

In an implementation, in an operation 302, process 300 may include receiving a token from a user. For instance, upon application startup at end user device 110, utterance collection application 220 may cause the end user device 110 to display a user interface that includes an input member configured to receive a token. The user may input the token via the input member. The token may be in the form of an alpha-numeric string, a machine readable code (e.g., a QR code, barcode, etc.), a number, and/or and other information that conveys a campaign identifier and/or a session identifier.

In an implementation, in an operation 304, process 300 may include obtaining campaign configuration parameters based on the token. For instance, the token may include a campaign identifier. In a particular implementation, the token may be configured as a string such as "ABCD12345", in which the first N (e.g., four) characters of the string encode the campaign identifier (e.g., "ABCD" in the foregoing example). In other instances, the token may be used to lookup, via a database search, the campaign identifier. Other methods of encoding a campaign identifier may be used as well. Regardless of the manner in which the token encodes the campaign identifier, process 300 may obtain the campaign identifier based on the token and obtain the campaign configuration parameters based on the campaign identifier.

In a particular implementation, the campaign configuration parameters may be stored at online storage system 103 (or other storage system) at a particular file location. In the file location, the campaign configuration parameters may be stored as filenames that begin with the campaign code. For example, the campaign configuration parameters may be stored in a configuration file whose prefix includes the campaign code and file extension includes ".config." The configuration file may written using JavaScript Object Notation, eXtensible Markup Language, or other data interchange format.

In a particular example, if a given campaign code is "ABCD," the corresponding configuration file will be named "ABCD.config." Thus, the token may encode the campaign code, which is then used to identify a corresponding configuration file that includes the campaign configuration parameters. Each time utterances for a given campaign should be collected, a token encoding the corresponding campaign code may be issued to one or more users (through crowd sourcing services 105 or otherwise).

Other ways of obtaining the campaign configuration parameters may be used as well. For instance, the campaign configuration parameters may be stored in a relational database in association with the campaign code (and/or a token identifier). The relational database may be queried to obtain the campaign configuration parameters. Other types of databases and schemes for associating the campaign code with its campaign configuration parameters may be used as well.

In an implementation, in an operation 306, process 300 may include configuring the utterance collection application based on the campaign configuration parameters. For instance, utterance collection application 220 may configure itself based on the campaign configuration parameters, as described in more detail with respect to FIG. 4.

In an implementation, in an operation 308, process 300 may include obtaining the utterances to be uttered by the user based on the token. In an implementation, the token may include a session script identifier that identifies a session script, which includes one or more prompts.

Each prompt may include a single utterance (e.g., set of words, phrases, or other utterance) to be uttered. For example, a given prompt may include one or more words or phrases, and/or other utterances to be uttered. For instance, the given prompt may include the words "POI," "Seattle," "Washington," and "USA." Other utterances to be spoken may be used as well.

In a particular implementation, the token may be configured as a string, in which a subset (e.g., five) of the characters of the string encode the session script identifier. Continuing the foregoing example in which token "ABCD12345" is used, the session script identifier may be identified based on the next N (e.g., 5) characters after the campaign code—in this case, the session script identifier will be "12345". In other instances, the token may be used to lookup, via a database search, the session script identifier. Other methods of encoding a session script identifier may be used as well. Regardless of the manner in which the token encodes the session script identifier, process 300 may obtain the session script identifier based on the token and obtain the utterances to be uttered based on the session script identifier.

In a particular implementation, a session script may be stored at online storage system 103 (or other storage system) at a particular file location. In the file location, the session script may be stored as a filename that begin with the session script identifier. For example, the session script may be stored in a session script file whose prefix includes the session script identifier and file extension includes ".ss". The session script file may written using JavaScript Object Notation, eXtensible Markup Language, or other data interchange format.

In a particular example, if a given session script identifier is "12345" the corresponding session script file will be named "12345.ss". Thus, the token may encode the session script code, which is then used to identify a corresponding session script file that includes one or more prompts each having an utterance to be uttered.

Other ways of obtaining the session script may be used as well, such as using the aforementioned relational database or other techniques described with respect to obtaining the campaign configuration parameters.

In an implementation, in an operation 310, process 300 may include conducting the collection of utterances, which may include providing a user interface for recording the utterances uttered by the user. The collection/recording of utterances is described in more detail with respect to FIGS. 5 and 6.

In an implementation, in an operation 312, process 300 may include saving and/or uploading the recorded utterances. In some implementations, the recorded utterances may be stored at end user device 110 and later uploaded (e.g., after a session is complete, as a batch process in which uploads occur at intervals, etc.). In these implementations, the recorded utterances may be stored locally at end user device 110 using the session script as a file prefix. Later, if the recordings are to be uploaded, the remote storage at which the recordings are uploaded is checked to determine whether a given recording has been previously uploaded (based on the session script identifier) and if not, the recording is uploaded. In some instances, the campaign administrator may obtain, through system 100, the recording directly from the end user device 110.

In other implementations, the recorded utterances may be uploaded as soon as they are recorded. For instance, when the user engages the "next" interface member to indicate the current prompt is complete and to obtain the next prompt, the recorded utterance from the current prompt may be uploaded. In these implementations, storage requirements imposed on the end user device 110 may be reduced.

In any instance where the recordings are uploaded, the uploads may be stored at a particular file location for the uploads. For instance, recordings for a given session (in which prompts for a session script are uttered by the user and recorded by end user device 110) may be stored in the upload file location under a sub-directory named based on a device identifier (e.g., a Media Access Control identifier and/or other identifier that uniquely identifies an end user device). Each recording may be named according to the session script identifier and a timestamp associated with the recording.

In an implementation, in an operation 314, process 300 may generating and providing a completion code if the campaign configuration parameters indicate that a completion code should be provided to the user. The completion code may be in the form of a string or other encoding that may be validated to compensate the user for participating in the task of uttering a specified utterance. For example, utterance collection application 220 may provide the completion code to the user via a display of an end user device and/or through a communication channel such as electronic mail, Short Messaging Service ("SMS") message, or other communication channel. In some instances, utterance collection application 220 may provide the completion code via communication channel to transcription system 102. In some instances, utterance collection application 220 may upload the completion code to the file area (or database) at which campaigns, session scripts, etc., are stored.

Figure 4:
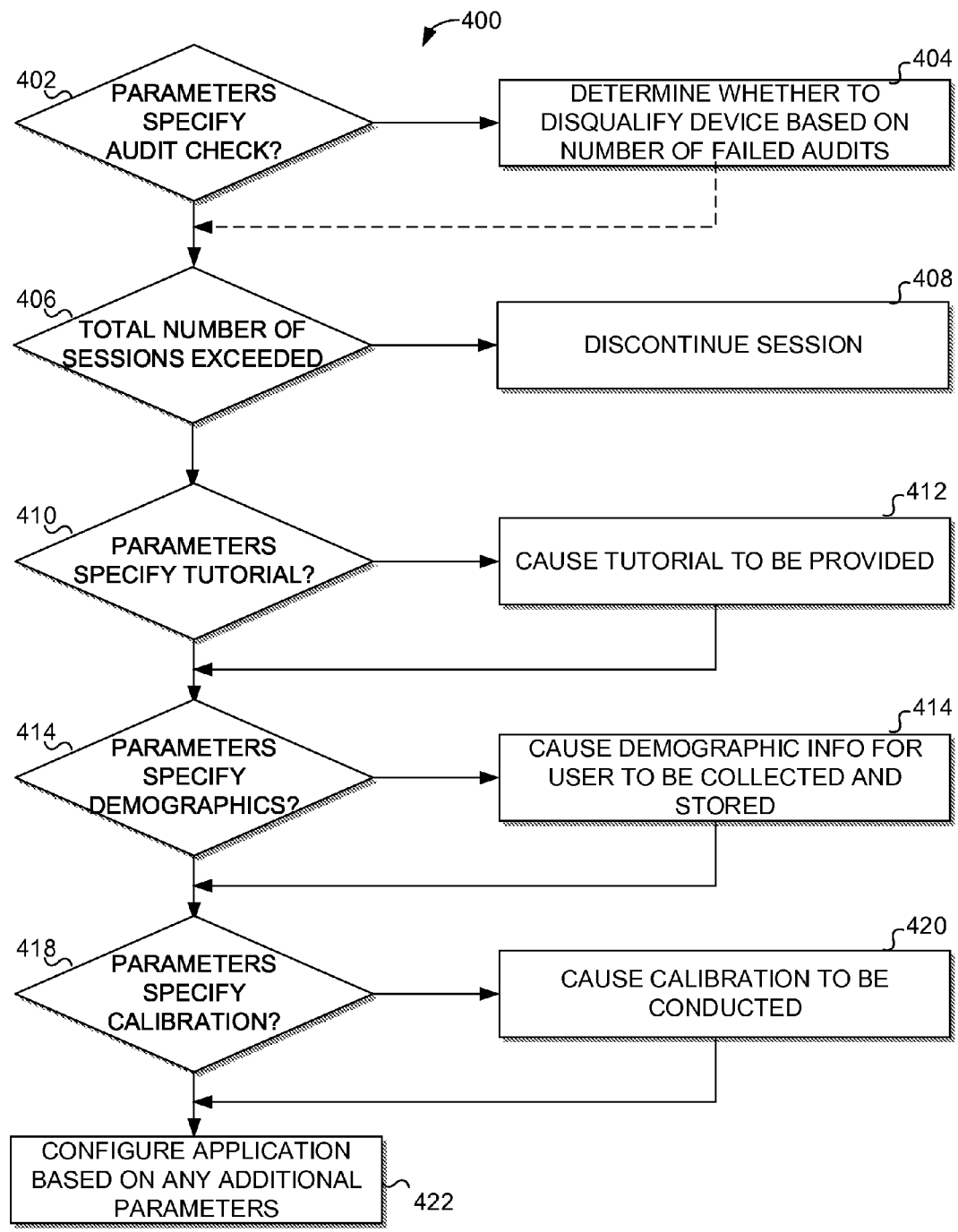
FIG. 4 illustrates a flow diagram of a process of configuring an application at an end user device for recording utterances to be spoken for building NER models, according to an implementation of the invention.

FIG. 4 illustrates a flow diagram of a process 400 of configuring an application at an end user device for recording utterances to be spoken for building NER models, according to an implementation of the invention.

In an implementation, in an operation 402, process 400 may include determining whether the campaign configuration parameters specify that an audit check should be performed. If so, in an operation, 404, process 400 may include determining whether to disqualify the end user device based on whether a number of failed audits associated with the end user device exceeds a threshold number of allowed failures (which may be specified by the campaign configuration parameters). The number of failed audits may be based on the number of audits that a given end user device 110 failed during a given campaign.

Auditing an End User Device

An end user device 110 may fail an audit when a user of end user device 110 incorrectly uttered an utterance associated with a prompt. Since a given prompt is associated with a given session script, which is in turn associated with a campaign, an end user device 110 is, in some instances, permitted only a limited number of failed audits for a given campaign. This is to ensure that the recorded utterances achieve a certain level of quality, and minimize the number of spammers or otherwise low quality users who provide utterances (through their end user devices).

To audit an end user device, utterance collection application 220 may perform Automated Speech Recognition ("ASR") to determine the text of the utterance uttered by a user or otherwise obtain the text of the utterance uttered by the user through ASR. In some instances, prompt within a session script may be predefined as being an audit utterance. In other words, at least some utterances may be tagged as being for audit purposes, and may or may not be part of the overall campaign of utterances for which the campaign administrator wishes to obtain recordings.

Whether or not an utterance is a dedicated audit utterance, utterance collection application 220 may obtain an edit distance between the utterance uttered by the user and the words, phrases, or other utterance specified by a given prompt. Such edit distance may be supplied by third parties or otherwise use conventional edit distance algorithms that provide a measure of different between two strings. If the edit distance is greater than a threshold edit distance, the audit is considered to have been failed. If so, utterance collection application 220 may generate and store an indication of the failure. In some instances, utterance collection application 220 may store audit information and save the audit information, locally and/or via file area. The audit information may include an indication of the audit result (e.g., failed or passed), the campaign identifier associated with the audit result, the session script identifier associated with the audit result, the prompt identifier associated with the audit result, the recorded utterance, the edit distance, and/or other information associated with the audit. As such, a record of the audit may be maintained and accessible.

In some instances, if the audit failed, an array or other data structure may be stored such that the number of failed audits for a given campaign may be determined. The number of failed audits may, alternatively or additionally, be determined based on the stored audit information.

In an implementation, in an operation 406, process 400 may include determining whether the number of sessions have been exceeded. For instance, the end user device may be permitted a maximum number of sessions in which to participate in a given campaign and/or the campaign may be associated with a total number of sessions that the campaign administrator wishes to collect utterances. If the total number of sessions has been exceeded, then the session is discontinued, and the user is informed that the maximum number of sessions has been reached in an operation 408.

In an implementation, in an operation 410, process 400 may determine whether the campaign configuration parameters specify that a tutorial should be presented to the user. If yes, then in an operation 412, the tutorial may be provided, as described herein.

In an implementation, in an operation 414, process 400 may include determining whether the campaign configuration parameters specify that demographics of the user should be collected. If yes, then demographic information of the user uttering the utterances may be collected in an operation 416. For instance, utterance collection application 220 may provide an interface that includes various inputs configured to receive demographic information from the user. The campaign configuration parameters may specify which demographic information to seek from the user so that the campaign administrator is able to obtain particular demographic information from the users who participate.

In an implementation, in an operation 418, process 400 may include determining whether the campaign configuration parameters specify that calibration should be performed. If yes, in an operation 420, calibration prior to recording utterances may be caused to be conducted. For instance, utterance collection application 220 may store a flag or other data indicator to indicate that calibration should be performed prior to allowing the user to record the utterances.

In an implementation, in an operation 422, process 400 may include obtaining other campaign configuration parameters (described herein) and configuring the utterance collection application 220 accordingly.

Figure 5:
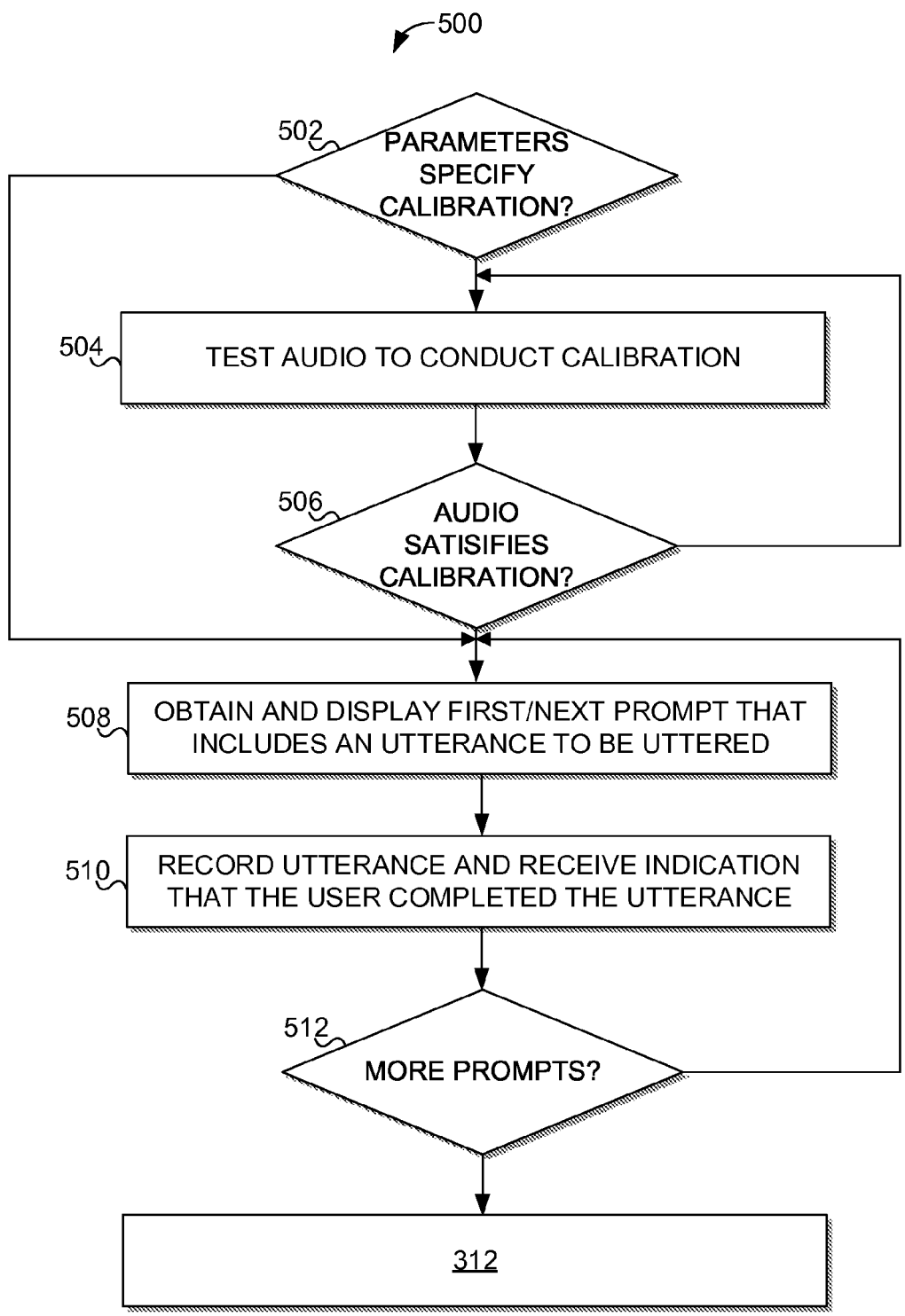
FIG. 5 illustrates a flow diagram of a process of recording utterances for building NER models, according to an implementation of the invention.

FIG. 5 illustrates a flow diagram of a process 500 of conducing the collection of utterances for building NER models, according to an implementation of the invention.

In an implementation, in an operation 502, process 500 may include determine whether the campaign configuration parameters specify that calibration should be performed.

If yes, in an implementation, in an operation 504, process 500 may include testing audio to conduct calibration. For example, utterance collection application 220 may sample live audio or record a predefined time period of audio in order to determine whether ambient noise (e.g., audio without a user uttering an utterance) passes calibration.

In an implementation, in an operation 506, process 500 may include determining whether the tested audio passes the calibration check. In an implementation, depending on a calibration parameter (among the campaign configuration parameters), a calibration check may require that a maximum level of ambient noise (e.g., a maximum decibel level) not be exceeded. For instance, the calibration check may ensure that the ambient noise is sufficiently low (e.g., below a predefined threshold decibel limit) so that the utterances can be properly recorded with minimal background noise. In other implementations, the calibration check may require that a minimum level of ambient noise (e.g., a minimum decibel level) be present. In these implementations, a campaign administrator may wish to obtain utterances in noisy areas (such as in bus stations, airports, etc.) in order to determine how utterances sound when background noise is present (e.g., above a certain decibel level).

Whichever type of calibration is specified, if the calibration check fails (e.g., the audio does not satisfy the calibration parameter), then utterance collection application 220 may request that the user try again (and in some instances provide a hint to move to a quieter or louder location) and processing may return to operation 504.

In an implementation, if the calibration check is passed or if no calibration check is specified, in an operation 508, process 500 may include obtaining and displaying a first (or next) prompt that includes an utterance to be uttered.

In an implementation, in an operation 510, process 500 may include recording the utterance and receiving an indication that the user completed the utterance. For instance, utterance collection application 220 may receive an indication that the "next" user interface member has been selected.

In an implementation, in an operation 512, process 500 may include determining whether any more prompts for the session is available. If yes, then processing may return to operation 508, where the next prompt is obtained and displayed. If no, then processing may proceed to operation 312 (illustrated in FIG. 3).

Figure 6:
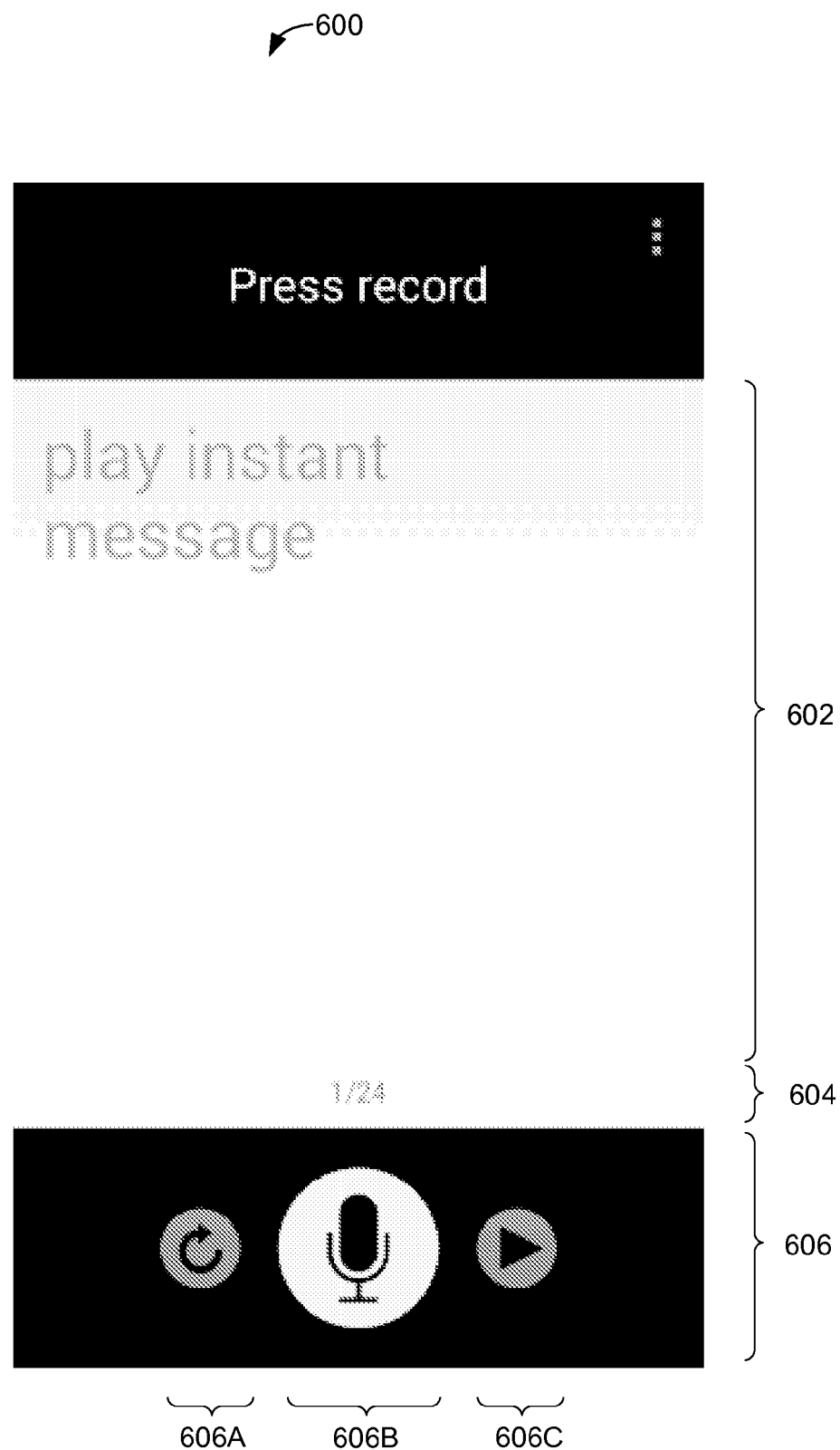
FIG. 6 illustrates a screenshot of a user interface for recording utterances, according to an implementation of the invention.

FIG. 6 illustrates a screenshot of a user interface 600 for recording utterances, according to an implementation of the invention. User interface member 602 may include a display area that displays an utterance to be uttered by the user. As illustrated, the utterance "play instant message" is to be uttered by the user. User interface member 604 may display a number of utterances (including any audit utterances) performed ("1") and remaining ("24"). User interface members 606 may include controls for progressing through recordings. For instance, user interface member 606A may include a button or other type of user input that, when selected by the user, specifies that the current utterance should be redone. For instance, user interface member 606B may include a button or other type of user input that, when selected by the user, specifies recording of the current utterance should commence. User interface member 606C may include a button or other type of user input that, when selected by the user, specifies that the current utterance is complete and that the next utterance (if any) should be displayed for the user to utter and record. In some instances, selection of the next button may also cause the recording of the current recording to be uploaded (if a network connection is not available, then the current recording will be stored locally until a network connection is available).

Examples of Configurations and Files Locations

The following configuration and other information provides an exemplary way to store and define various settings described herein. As would be appreciated, other ways of storing and conveying the following may be used as well.

Campaign Configuration Parameters

S3 Location: data/settings/

After the user enters the token and utterance collection application 220 extracts the campaign code from it, utterance collection application 220 may use it to check whether a .config file exists within data/settings. If one does, it may download and parse the .config file.

The file contains necessary information to configure the application, such as decibel levels, a number of sessions a user is permitted to participate, and which file locations to find tutorial and demographic information.

Table 1 describes various campaign configuration parameters. The following table is provided for illustrative purposes and should not be construed as limiting, as other campaign configuration parameters may be used as well.

| Key | Description | Type | Example |
|---|---|---|---|
| version | Schema version of the settings file. | Double | 1.0 |
| id | Same as the filename. Used to easily identify the settings file. | String | "ao9hz3" |
| db_levels | Defines the different decibels levels to be used by the VU meter during prompt recording and calibration. | | |
| db_levels.min | The minimum decibel level. | Double | 0 |
| db_levels.grn_max_ylw_min | The maximum decibel level for the green range and the minimum for the yellow. | Double | 10.5 |
| db_levels.ylw_max_red_min | The maximum decibel level for the yellow range and the minimum for the red. | Double | 20 |
| db_levels.max | The maximum decibel level. | Double | 30 |
| tutorial | Name of the .tut file to download tutorials from S3. Exclude to skip tutorials. Should not contain spaces. | String | "test_tut" |
| demographic | Name of the .dem file to download demographic options from S3. Exclude to skip demographic. Should not contain spaces. | String | "test_dem" |
| session_script_dir | Name of folder within data/sessions. scripts in which campaign's session scripts are kept. | String | "test_campaign" |
| number_of_sessions | The number of sessions [1 – n]a user can do. | Integer | 1 |
| duplicate_sessions | Whether a device can repeat a session. Should be true if a device is shared. | Boolean | true \| false |
| do_calibration | Whether the calibration screen should be displayed. | Boolean | true \| false |
| external_storage | Whether temporary, completed, and zip files should be saved in the app's internals storage (more secure) or external folder. If external, an app folder may be created. | Boolean | true \| false |
| failed_audits_threshold | Total number of failed audits a given device is allowed. If a device's total equals this value, device may not be able to continue with campaign. | Integer | 10 |
| upload | Whether to automatically upload audio files and other information. | Boolean | true \| false |
| generate_completion_code | Whether to generate an 8-digit alphanumerical string at the end of each completed session | Boolean | true \| false |
| max_audio_length | The maximum length an audio recording can be, in milliseconds. | Long | 12000 |

| Key | Description | Type | Example |
|---|---|---|---|
| silence | Silence to precede and following each audio recording | | |
| silence.leading | Duration of silence prepending the audio recording, in milliseconds. Default is 500 | Long | 1000 |
| silence.trailing | Duration of silence to append the audio recording, in milliseconds. Default is 1000 | Long | 5000 |

Tutorial
Filename: <tutorial_value_from_config>.tut
S3 Location: data/tutorials/

A tutorial may help a new user familiarize themselves with utterance collection application 220, its features, and how to properly and successfully record and complete a session.

The contents of a tutorial may be derived from a .tut file found within the data/tutorials bucket containing the JSON fields described below.

The name of the tutorial file should be the same as the value of the tutorial field within the .config file. For example, if the .config file's tutorial field's value was test_tutorial, then the tutorial file should be named test_tutorial.tut.

Table 2 describes the content of a tutorial (".tut") file. The following table is provided for illustrative purposes and should not be construed as limiting, as other content may be used as well.

| Key | Description | Type | Example |
|---|---|---|---|
| version | Schema version of the tutorial file. | Double | 1.0 |
| slides | Each node within the array contains information for one page of the tutorial. | | |
| slides.title | The title of the tutorial slide. | String | "Step 1" |
| slides.body | Text to be displayed as part of the tutorial. New paragraphs must be denoted with newline escape character (\n). | String | "Lorem ipsum dolor . . .\nDonec et fermentum dui . . ." |
| slides.image | Information about the image to be displayed on the tutorial page. | JSON Object | |
| slides.image.url | URL from where the image can be downloaded by app. | String | "www.site.com/image1.jpg" |
| slides.video | Information about the video to be displayed on the tutorial page. | JSON Object | |
| slides.video.url | The YouTube video's ID | String | "BY651oCxGiQ" |

Demographic Information
Filename: <demographic_value_from_config>.dem
S3 Location: data/demographics/

A campaign administrator may choose to collect demographic information about the user. In order to do so, they must create a .dem file containing the following fields and upload it to the data/demographic bucket on S3. Furthermore, in the .config file defining the campaign, the must provide a demographic field with the value set to the name of the .dem file.

The name of the demographic file should be the same as the value of the demographic field within the .config file. For example, if the .config file's demographic field's value was test_demographic, then the demographic file should be named test_demograpic.dem.

After a user has filled out the demographic information, utterance collection application 220 may create a .dem.info file with the filename being the same as the device's UUID and upload it to the upload directory as described within the In-Session Uploading section.

Table 3 describes the content of a demographic (".dem") file. The following table is provided for illustrative purposes and should not be construed as limiting, as other content may be used as well.

| Key | Description | Type | Example |
|---|---|---|---|
| version | Schema version of the demographic file. | Double | 1.0 |
| data_points | | | |
| data_points.label | Name of the field. May be displayed beside the input field. | String | "First name" |
| data_points.required | Whether the user is required to provide this information. | Boolean | true\|false |
| data_points.type | Used to identify what type of input field to display.<br>0 = Text field (EditText)<br>1 = List (Spinner)<br>2 = Checkboxes<br>3 = Radio buttons<br>4 = Switch | Integer | 0\|1\|2\|3\|4 |
| data_points.hint | A hint of what the user should input. Only used for type 0. | String | "e.g., Bob" |
| data_points.options | Options to populate types 1, 2, and 3. | List<String> | ["Male", "Female", "Other"] |
| data_points.default | Whether the Switch should be set to true or false by default. | Boolean | true\|false |

Session Script
Filename: <id>.ss
S3 Location: data/session.scripts/<campaign-code>/

A session script can be thought of as a container for multiple prompts. A session script can be given a name, used internally, to help identify the type of prompts it contains, such as "POI-Seattle-WA-USA".

Table 4 describes the content of a session script (".ss") file. The following table is provided for illustrative purposes and should not be construed as limiting, as other content may be used as well.

| Key | Description | Data Type | Example |
|---|---|---|---|
| version | Schema version of the .ss file. | Double | 1.2 |
| id | A unique 12 character alphanumerical string used to identify the session script. | String | "5C3D6D4E2981" |

| Key | Description | Data Type | Example |
|---|---|---|---|
| name | Name given to the session. This won't be displayed to the user. Used for internal use. | String | "POI - Seattle - WA - USA" |
| language-culture | Language-culture information about the script. This may not be used by The utterance collection application but for post-processing. | String | "en-us" |
| prompts | Array that contains a list of Prompts. | List<Prompt> | |
| audio_config | Configurations for all the audio files generated during the session. If this field is missing, the app may use the defaults provided below. | | |
| audio_config.sample_rate | The sample rate for the audio recording. Default is 16000 | Integer | 16000 |
| audio_config.format | The format for the audio recording. Default is "WAV". | String | "WAV" | "RAW" | "PCM" |
| audio_config.channel | Integer representing mono or stereo. Default is 1 | Integer | 1 = Mono<br>2 = Stereo |
| audio_config.bit_rate | The bit rate for the recording. Default is 8. | Integer | 16 |

Prompt

The Prompt JSON may be parsed by the application and used to create visual prompts for the user to make utterances with. This JSON defines the necessary fields needed for the initial prompt creation and display along with information used to linking prompts with their audio files and device information.

If session_type is "scripted", then display_text must be defined. Otherwise, the Prompt may be rejected.

If session_type is "free-form" and audit_src may be ignored even if it is defined.

Table 5 describes the content of a prompt configuration. The following table is provided for illustrative purposes and should not be construed as limiting, as other content may be used as well.

Logging

Filename: session.log

S3 Location: data/uploads/<campaign-code>/<device-id>/<session-script-id>/

Each session may have a log file generated and uploaded at the end of the session.

As the user progresses through the queue of prompts, utterance collection application 220 may collect statistical information, such as how long they spent a prompt, how many times they retried it, and how often they left the applications. At the end of the session, this log file may be uploaded into the same directory as the rest of the session's data.

The data collected may be in JSON format and should be structured accordingly.

| Key | Description | Data Type | Example |
|---|---|---|---|
| id | A unique 20 character alphanumerical string used to identify the prompt. | String | "672616b39bab4cf4a162" |
| utterance | The original utterance provided by a campaign administrator. | String | "How is the traffic on I-5?" |
| display_text | The utterance to be spoken by user. It is displayed as main prompt to user. | String | "How is the traffic on I-5?" |
| tip | Used to help user properly pronounce display_text. | String | "Pronounce it has eye-five." |
| session_type | Represents whether the Prompt is free-form or scripted. | String | "free-form" OR "scripted" |
| audit_src | Defines the manner in which the Prompt should be audited. If left blank, the Prompt may not be audited. Default is "VBT" | String | "Google" | "VBT" |
| edit_distance | Word-for-word difference tolerance threshold from what ASR returns and the prompt's text. | Double | 4.5 |
| min_audio_length | The minimum length, in milliseconds, the audio recording for this prompt can be. Default is 1000. | Long | 2000 |

Table 6 describes the content of a log file. The following table is provided for illustrative purposes and should not be construed as limiting, as other content may be used as well.

| Key | Description | Type | Example |
|---|---|---|---|
| version | Schema version of the .log file. | Double | 1.5 |
| origin.token | The token entered by the user. | String | "ABCDEF6A1" |
| origin.campaign_code | Campaign code | String | "ABCD" |
| origin.session_script_id | Session script ID | String | "EF6A1F52587C" |
| origin.device_id | User's device ID. | String | "c6c479b4-3cf6-42ad-81a5" |
| prompts | List containing statistical info about each prompt. | | |
| prompts.pause | Total amount of time, in milliseconds, the user paused on given Prompt. | Long | 12500 |
| prompts.start_time | The time, in epoch, when the user started the prompt. | Long | 1408552410 |
| prompts.duration | Total time spent on a prompt, in milliseconds. Includes pauses. | Long | 35000 |
| prompts.end_time | The time, in epoch, when the user ended the prompt. | Long | 1408552410 |
| prompts.json | The prompt's JSON. See Prompt section for details. | | |
| prompts.redos | Total amount of times the user redid a Prompt. | Integer | 4 |
| statistics | Statistical information for the entire session and all prompts. | | |
| statistics.session | Statistical information about the entire session. | | |
| statistics.session.start_time | The start time of the session, in epoch. | Long | 1408552410 |
| statistics.session.duration | Total time spent on the session, in milliseconds. | Long | 35000 |
| statistics.session.end_time | The time when the user completed the session, in epoch. | Long | 1408552410 |
| statistics.prompts.redos | Information regarding redos done throughout the session. | | |
| statistics.prompts.redos.average | The average number of redos performed. | Double | 2.5 |
| statistics.prompts.redos.total | Total number of redos done throughout the session. | Integer | 12 |
| statistics.prompts.redos.max | Information about the maximum amount of redos done. | | |
| statistics.prompts.redos.max.count | The max number of redos. | Integer | 25 |
| statistics.prompts.redos.max.id | Prompt ID from which the maximum number of redos originated. | String | 6f2544fb3fbf426998ab |
| statistics.prompts.shortest | Information about the shortest time spent on a prompt. | | |
| statistics.prompts.shortest.duration | Total amount of time, in milliseconds, spent on the prompt. | Long | 1500 |

-continued

| Key | Description | Type | Example |
|---|---|---|---|
| statistics.prompts.shortest.id | Prompt ID | String | e3335ab9a94748dfa163 |
| statistics.prompts.longest | Information about the most time spent on a prompt. | | |
| statistics.prompts.longest.duration | Total amount of time, in milliseconds, spent on the prompt. | Long | 60000 |
| statistics.prompts.longest.id | Prompt ID | String | bf3d601a35c74e098a49 |
| statistics.prompts.average_duration | Average amount of time, in milliseconds, spent on a prompt. | Long | 45000 |

Device Information
Filename: device.info
S3 Location: data/uploads/<campaign-code>/<device-id>/<session-script-id>/

When utterance collection application 220 is launched, it may collect information about the device, its location, and what version of the utterance collection application is being run. It may output this information into a .dev.info file as a JSON object.

The filename should be that of the device's UUID followed by the extension defined above. The file should then be uploaded into the upload folder as described within the In-Session Uploading section.

Table 7 describes the content of a device info file. The following table is provided for illustrative purposes and should not be construed as limiting, as other content may be used as well.

| Key | Description | Type | Example |
|---|---|---|---|
| version | Schema version of the .info file. | Double | 1.5 |
| origin | Information about which, campaign, device, and session the file originated from. | | |
| origin.token | The token entered by the user. | String | "ABCDD210B" |
| origin.campaign_code | Campaign code | String | "ABCD" |
| origin.session_script_id | Session script ID | String | "D21084423984" |
| origin.device_id | User's device ID. | String | "c6c479b4-3cf6-42ad-81a5-49f6dd079c7e" |
| app_version | The utterance collection application app version number. | String | 0.1 SNAPSHOT 2" |
| board | The name of the underlying board. | String | "Goldfish" |
| bootloader | The system bootloader version number. | String | "N7100XXUFNE1" |
| brand | The consumer-visible brand with which the product/hardware may be associated, if any. | String | "samsung" |
| cpu_abi | The name of the instruction set (CPU type + ABI convention) of native code. | String | "armeabi-v7a" |
| cpu_abi2 | The name of the second instruction set (CPU type + ABI convention) of native code. | String | "armeabi" |
| display | A build ID string meant for displaying to the user | String | "KOT49H.N7100XXUFNE1" |
| fingerprint | A string that uniquely identifies this build. | String | "samsung/t03gxx/" |
| hardware | The name of the hardware (from the kernel command). | String | "smdk4x12" |
| id | Either a change list number or a label. | String | "M4-rc20" |
| latitude | Latitude coordinates of the device's location. | String | "47.6333578" |
| longitude | Longitude coordinates of the device's location. | String | "-122.1801977" |
| manufacturer | The manufacturer of the product/hardware. | String | "samsung" |
| model | The end-user-visible name for the end product. | String | "GT-N7100" |

| Key | Description | Type | Example |
|---|---|---|---|
| product | The name of the overall product. | String | "t03gxx" |
| serial | A hardware serial number, if available. | String | "4df1218932298f0f" |
| tags | Comma-separated tags describing the build. | String | "unsigned" |
| type | The type of build, like "user" or "eng". | String | "user" |
| version_incremental | The internal value used by the underlying source control to represent this | String | "N7100XXUFNE1" |
| version_release | The user-visible version string. | String | "4.4.2" |
| version_sdk_number | The user-visible SDK version of the framework. | String | "19" |

User Information
Filename: user.info
S3 Location: data/uploads/<campaign-code>/<device-id>/<session-script-id>/

User information is gathered from the Demographic screen, which is derived from the .dem file. The data may be outputted in a JSON format using the following pattern keeping in mind that each .dem's data_point is the key and the value being the user's response.

Table 8 describes the content of a user info file. The following table is provided for illustrative purposes and should not be construed as limiting, as other content may be used as well.

| Key | Description | Data Type | Example |
|---|---|---|---|
| version | Schema version of the user .info file. | Double | 1.5 |
| origin | Information about which, campaign, device, and session the file originated from. | | |
| origin.token | The token entered by the user. | String | "ABCDD210B" |
| origin.campaign_code | Campaign code | String | "ABCD" |
| origin.session_script_id | Session script ID | String | "D210B4423984" |
| origin.device_id | User's device ID. | String | "c6c479b4-3cf6-42ad-81a5-49f6dd079c7e" |
| data_points | List of label and selected options value derived from the .dem file and what the user inputted in the Demographic screen. | | |
| data_points.key | The label of the data_point from the .dem file for which the user is providing an answer. | String | "First name" |
| data_points.value | The value selected from the options list for which the user is providing an answer. | String | "John" |

Audio Files
Filename: <token>_<device-id>_<prompt-id>_<epoch-time>.<audio_config.format>
S3 Location: data/uploads/<campaign-code>/<device-id>/<session-script-id>/
Auditing
Filename: <device-id>.aud
S3 Location: data/audits/<campaign-code>

To maintain a high level of quality and block spammers, auditing on a prompt-level may be introduced and maintained by the applications.

If a particular prompt is to be audited, it may have its audit_src value set to "Google" and provide an edit_distance value greater than 0.

Edit Distance

The edit distance is used to measure how two phrases are different on a word-for-word basis. It is represented by a whole number (e.g., 10). Each Prompt may have its own edit distance provided by the Campaign Administrator.

Tracking Failed Audits

If a user fails an audit, it must be tracked on a per-campaign basis. This may be done by creating and updating an audit file (.aud) within data/audits/<campaign-code> every time a user fails an audit.

If the same device is reused, auditing should be turned off by omitting the failed_audits_threshold field within the .config file, setting the audit_src value, within a Prompt, to "VBT", and omitting the edit_distance field.

Table 9 describes the content of an audit file. The following table is provided for illustrative purposes and should not be construed as limiting, as other content may be used as well.

| Key | Description | Data Type | Example |
| --- | --- | --- | --- |
| version | Schema version for the .aud file. | Double | 1.6 |
| failures | List containing information about prompts the device failed audit on. | | |
| failures.token | Token entered by user and from where the failure originated. | String | "58WEPO093" |
| failures.campaign_code | Campaign code derived from the token and from where the failure originated. | String | "58WE" |
| failures.session_script_id | The session script's ID from which the failure originated. | String | "PO0933C1F560" |
| failures.prompt_id | The prompt's ID from which the failure originated. | String | "3E75BA1EF145493290E3" |
| failures.utterance | The utterance of the Prompt from which the failure originated. This should be the same as the utterance field of the prompt from the session script file (.ss) | String | "How is the traffic on I-5?" |
| failures.audit_stt | The string returned by the audit source (e.g., Google) | String | "How is the traffic on I5" |

Handling & Maintaining Disqualification

If a user passes the failed_audits_threshold value while they are in the middle of a session, they may not be disqualified right away. Instead, they'll be allowed to complete the session and a completion code (if generate_completion_code is set to true in .confg file).

The failed_audits_threshold value check is done when the user first enters the token code at the beginning of app launch. Here is how the application should check:

Check data/audits/<campaign-code> for a .aud file with the same filename as the device's ID If one exists, download the file, parse the JSON within, and count the JSON array.

If the size of the array is greater-than the failed_audits_threshold, then the user is disqualified from participating in the campaign and is shown a disqualification page.

Completion Codes

If generate_completion_code is set to true within the .config file, at the end of a successful completion of a session, the application may generated a unique 8-character alphanumerical string. The Completion Code may be displayed to the user who can then enter it on the crowdsourcing website to validate that they've successfully completed a single session.

In addition, the Completion Code may be stored for later retrieval. The three cases in which the Completion Code made be retrieved are described below.

Crowdsourcing Validation

Within data/completion_codes/<campaign-code> folder, an empty file named after the completion code is uploaded.

This bucket is later queried by an automation script developed by the Campaign Administrator to validate, in real-time, whether the completion code entered by the user matches any of the empty text files within the bucket. If one exists, validation passes and the file is removed to ensure that the same completion code cannot be reused.

Post-Processing

During post-processing, if one needs to know the Completion Code given to the participate at the end of a session, the completion code generated by the application may be stored with the same name as the completion code (e.g., "KSYUV2DU").

The file may be stored on the following location on S3: data/uploads/<campaign-code>/<device-id>/<session-script-id-plus-epoch-timestamp>

Application Retrieval

Utterance collection application 220 may allow a user to retrieve all the Completion Codes generated by them over a course of several sessions per campaign.

This may be done by maintaining a JSON file named completion_codes.cc. As the user completes a session and the application generated the Completion Code, it may be appended to the JSON.

Table 10 describes the content of a completions codes file. The following table is provided for illustrative purposes and should not be construed as limiting, as other content may be used as well. The file may be saved within the following bucket, ensuring that just one file exists for each device and each campaign:

data/uploads/<campaign-code>/<device-id>/

| Key | Description | Data Type | Example |
| --- | --- | --- | --- |
| token | Token entered by user and for which the completion code was generated. | String | "58WEPO093" |
| campaign_code | Campaign code derived from the token and which the completion code was generated. | String | "58WE" |
| session_script_id | The session script's ID for which the completion code was generated. | String | "PO0933C1F560" |
| session_name | The session script's name from which the completion code was generated. | String | "Session 0001" |

-continued

| Key | Description | Data Type | Example |
|---|---|---|---|
| completion_code | The 8-digit alpha-numerical Completion Code generated by the app at the end of the session Script. | String | "ADXGCAKW" |

In-Session Uploading

Each time a Prompt is completed and the user hits the "Next" button to load the next Prompt in the queue, utterance collection application 220 may automatically upload the audio file onto S3.

The added benefit of having in-session uploading, is that a Campaign Administrator can monitor, in real-time, the progress of a particular user.

Storage Structure

Table 11 describes the an exemplary storage scheme. The following table is provided for illustrative purposes and should not be construed as limiting, as other storage schemes (as described herein and may be apparent based on the instant disclosure) may be used as well.

| Path | Definition |
|---|---|
| audits/<campaign_code> | Where a <device-id>.aud file is stored tracking the number of audits a user has failed. See Auditing section. |
| completion.codes/<campaign-code> | Where an empty file, named after the Completion Code generated at the end of a session, is stored. They are stored within a sub-directory named after the corresponding campaign's code. These files are used during the Crowdsourcing Validation phase. |
| demographics/demographic>.dem | Where .dem files are stored. These files are used to construct the Demographic page in The utterance collection application. The name of the .dem file is provided in the demographic field within the .config JSON. See Demographics for JSON structure details and Configuration for .config details. |
| session.scripts/<session_script_dir> | Where session Script files (.ss) are kept. The sub-directory, in which these files are kept, is defined in the .config file's session_script_dir field. |
| settings | Where the .config is kept. These files are named after the campaign code, which is derived from the token. See Configuration for JSON structure and field definitions. |
| tutorials/<tutorial>.tut | Where .tut files are stored. These are used to construct the various Tutorial pages in The utterance collection application. The filename for them is given within the .config file. |

| Path | Definition |
|---|---|
| uploads/<campaign-code>/<device-id>/<session-script-id-timestamp> | Where all files associated with a single session are uploaded. These files include: Audio files (.wav) Demographics files (.dem and user.info) Device information (device.info). Tutorials (.tut). Configuration (.config). Session Script (.ss). Completion code |

External Device Storage

Sometimes, a Campaign Administrator may not want completed session information to be uploaded to our S3 bucket. Instead, they want to be able to retrieve it from the device itself. In order to achieve this, the external_storage field in the .config file of the campaign should be set to true.

When this is done, all audio files, demographic information, and other user-generated data is stored within the phone's external storage. The file structure mimics the one found under the data/uploads folder, as described above, with one key difference; the <device-id> folder is removed and everything below is moved up one directory.

So instead of having this file structure (from S3):
uploads/<campaign-code>/<device-id>/<session-script-id-timestamp>

It would be:
the utterance collection application/<campaign-code>/<session-script-id-timestamp>

File Compression

In order to save space on devices where multiple sessions and campaigns are run, after a user successfully completes a session, all the files within the /<session_script_id_timestamp> may be zipped into a .zip file originally introduced in The utterance collection application 1.0.

The filename may be structured as such:
device-id_session-id_epoch-time.zip

Calibration

Some Campaign Administrators may want the campaigns, and its sessions, to be conducted under a quite environment with minimal ambient noise. In order to ensure this is the case, The utterance collection application has a new Calibration features.

When enabled, the utterance collection application may display a Calibration UI before the beginning of a session. In the UI, the user may be instructed to hold the phone at an optimal distance and in the correct form. There may be a horizontal VU meter with green, yellow, and red sections. It may, in real-time, illustrate the noise being picked up by the device's microphone.

The Calibration feature can be enabled by settings the do_calibration field (within .config) to true. Furthermore, the green, yellow, and red ranges of the VU meter can be defined through the db_levels field in the same configuration file.

The use of the VU meter may help in two ways:

It may help the user get a better understanding of whether their environment is quiet enough to produce clear and noise-free recordings.

It lets the user know whether their voice is loud enough to be picked up by their device's microphone.

The actual design of the VU meter should be very simple. It should consist of a vertical meter bar that light up as the noise level increases—with the lights building on top of one another.

Green—the noise level is acceptable.

Orange—the noise level is getting high.

Red—the noise level is unacceptable. During calibration, this should prevent the user from advancing forward.

The VU meter should measure the environment's volume for 10 seconds, which may be considered the calibration period. During this time, the meter should fluctuate, in real-time, with the volume level of the environment—it should not be static. This may guarantee a nice user experience and real-time feedback to the user and application.

In addition, during the calibration period, if the meter reaches red and stays there for more than 3 seconds, the time should restart and warn the user that their environment is too loud and that they cannot proceed any further until 10 seconds have elapsed with the meter remaining within the green and orange levels.

The user may not be able to progress to the first session until they are able to successfully complete the Calibration screen.

Versioning

Filename: manifest.mf

S3 Location: uploads/<campaign-code>/<device-id>/<session-script-id-timestamp> used as well. The file may be saved within the following bucket, ensuring that just one file exists for each device and each campaign:

| Key | Description | Data Type | Example |
|---|---|---|---|
| version | Version of the manifest file. | Double | 1.2 |
| files | List containing versioning information of each file within the upload folder. | | |
| files.name | Proper name of the file. | String | |
| files.extension | The file extension. | String | ".ss" |
| files.version | The version of the mentioned file. This should be taken from the file's version field. | Double | 1.5 |

Edge-Case & Error Handling

Table 13 outlines how the utterance collection application should behave if certain scenarios are encountered. The following table is provided for illustrative purposes and should not be construed as limiting, as other scenarios/resolutions may be used as well.

| Scenario | Issue | Mitigation |
|---|---|---|
| 1 | User is disqualified because they have exceeded the failed_audits_threshold value in the .config file. | The application may display either a screen or a dialog explaining that they have exceeded the maximum allowed audit failures and cannot participate in this particular campaign. |
| 2 | User has used up the allotted quota of sessions per campaign. | The application may display either a screen or a dialog explaining that they have exceeded the maximum allowed number of sessions per user for the given campaign. |
| 3 | User does not have network connectivity on app launch. | The user is presented with a dialog indicating that they must connect to the internet before proceeding. Clicking "OK" on the dialog may take them to their device's Network Connection settings. |
| 4 | During a Prompt's audio file upload, the user loses network connectivity. | The user is not prompted when this happens. Instead, at the end of the session, the application may check the upload bucket against locally stored files. If any local files are not on S3, it may attempt to upload them. |
| 5 | Silence detection does not detect silence and the recording continues. | One of two things can happen: The user can manually press the 'Stop Recording' button. The max_audio_recording limit is hit and the app automatically stops recording. |
| 6 | The user fails too many audits while in session. | Nothing is displayed or indicated to the user. Instead, in the background, the audit count, described in Tracking Failed Audits, is quietly incremented. |

All JSON files consumed and produced by the application must have a version field. This may aid automation scripts in the post-processing phase. In particular, it may help identify what data a particular file contains (or does not contain) by their version number.

It is important that every time a field is added, removed, or adjusted within a file, the version number must be incremented.

In addition, every time an upload folder is created on S3 or within a device (if external_storage is set to true in the .config file), a manifest file may be added which may include a list of all the files to be found within the folder and their version.

The manifest file may be a JSON containing an array of name, extension, and version fields.

Table 12 describes the content of a manifest file. The following table is provided for illustrative purposes and should not be construed as limiting, as other content may be The one or more processors 212 illustrated in FIG. 2 may each include one or more physical processors that are programmed by computer program instructions. The various instructions described herein are exemplary only. Other configurations and numbers of instructions may be used, so long as the processor(s) 212 are programmed to perform the functions described herein.

Furthermore, it should be appreciated that although the various instructions are illustrated in FIG. 2 as being co-located within a single processing unit, in implementations in which processor(s) 212 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 212 may be programmed by one or more additional instructions that may perform some or all of the functionality attributed herein to one of the instructions.

The various instructions described herein may be stored in a storage device 214, which may comprise random access memory (RAM), read only memory (ROM), and/or other memory. The storage device may store the computer program instructions (e.g., the aforementioned instructions) to be executed by processor 212 as well as data that may be manipulated by processor 212. The storage device may comprise floppy disks, hard disks, optical disks, tapes, or other storage media for storing computer-executable instructions and/or data.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network 107, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of recording utterances from unmanaged crowds for natural language processing, the method being implemented in an end user device having one or more physical processors programmed with computer program instructions that, when executed by the one or more physical processors, cause the end user device to perform the method, the method comprising:
    obtaining, by the end user device, a token;
    obtaining, by the end user device, one or more campaign configuration parameters based on the token;
    configuring, by the end user device, the computer program instructions based on the one or more campaign configuration parameters;
    obtaining, by the end user device, one or more utterances to be uttered by a user based on the token;
    displaying, by the end user device, the one or more utterances to be uttered by the user;
    generating, by the end user device, an audio recording of the one or more utterances; and
    causing, by the end user device, the audio recording to be provided to a remote device via a network.

2. The method of claim 1, wherein the token comprises an alphanumeric string.

3. The method of claim 2, wherein obtaining the one or more campaign configuration parameters comprises parsing the alphanumeric string to obtain a campaign identifier that is associated with the one or more campaign configuration parameters.

4. The method of claim 3, wherein obtaining the one or more utterances to be uttered comprises parsing the alphanumeric string to obtain a session script identifier that is associated with the one or more utterances to be uttered.

5. The method of claim 3, wherein the one or more campaign configuration parameters comprises a configuration parameter that indicates that an audit check should be performed, the method further comprising:
    configuring, by the end user device, the computer program instructions to determine whether a number of failed audits associated with the campaign identifier with which the end user device was involved exceeds a predetermined threshold number of failed audits; and
    responsive to a determination that the number of failed audits with which the end user device was involved exceeds the predetermined threshold number of failed audits, preventing the end user device from participating in additional utterance recordings associated with the campaign identifier.

6. The method of claim 1, wherein the one or more campaign configuration parameters comprises a calibration parameter that indicates that a calibration test should be performed, the method further comprising:
    configuring, by the end user device, the computer program instructions to perform a calibration test prior to generating the audio recording, by:
        determining, by the end user device, a level of ambient noise;
        determining, by the end user device, whether the level of ambient noise satisfies the calibration test, wherein the one or more utterances to be uttered are displayed responsive to a determination that the ambient level of audio satisfies the calibration test.

7. The method of claim 6, wherein the calibration parameter specifies a minimum level of ambient noise to satisfy the calibration test.

8. The method of claim 6, wherein the calibration parameter specifies a maximum level of ambient noise to satisfy the calibration test.

9. The method of claim 1, the method further comprising:
    generating, by the end user device, a completion code responsive to a determination that a corresponding audio recording has been generated for each one of one or more utterances, wherein the completion code is configured to provide information that validates the one or more utterances have been uttered and recorded.

10. The method of claim 1, wherein causing the audio recording to be provided to a remote device via a network comprises:
immediately uploading, by the end user device, the audio recording to the remote device instead of through a batch process.

11. A system of recording utterances from unmanaged crowds for natural language processing, the system comprising:
an end user device having one or more physical processors programmed with computer program instructions that, when executed by the one or more physical processors, cause the end user device to:
obtain a token;
obtain one or more campaign configuration parameters based on the token;
configure the computer program instructions based on the one or more campaign configuration parameters;
obtain one or more utterances to be uttered by a user based on the token;
display the one or more utterances to be uttered by the user;
generate an audio recording of the one or more utterances; and
cause the audio recording to be provided to a remote device via a network.

12. The system of claim 11, wherein the token comprises an alphanumeric string.

13. The system of claim 12, wherein to obtain the one or more campaign configuration parameters, the end user device is further programmed to:
parse the alphanumeric string to obtain a campaign identifier that is associated with the one or more campaign configuration parameters.

14. The system of claim 13, wherein to obtain the one or more utterances to be uttered, the end user device is further programmed to:
parse the alphanumeric string to obtain a session script identifier that is associated with the one or more utterances to be uttered.

15. The system of claim 13, wherein the one or more campaign configuration parameters comprises a configuration parameter that indicates that an audit check should be performed, and wherein the end user device is further programmed to:

configure the computer program instructions to determine whether a number of failed audits associated with the campaign identifier with which the end user device was involved exceeds a predetermined threshold number of failed audits; and
responsive to a determination that the number of failed audits with which the end user device was involved exceeds the predetermined threshold number of failed audits, prevent the end user device from participating in additional utterance recordings associated with the campaign identifier.

16. The system of claim 11, wherein the one or more campaign configuration parameters comprises a calibration parameter that indicates that a calibration test should be performed, and wherein the end user device is further programmed to:
configure the computer program instructions to perform a calibration test prior to generating the audio recording, wherein to perform the calibration test, the end user device is further programmed to:
determine a level of ambient noise;
determine whether the level of ambient noise satisfies the calibration test, wherein the one or more utterances to be uttered are displayed responsive to a determination that the ambient level of audio satisfies the calibration test.

17. The system of claim 16, wherein the calibration parameter specifies a minimum level of ambient noise to satisfy the calibration test.

18. The system of claim 6, wherein the calibration parameter specifies a maximum level of ambient noise to satisfy the calibration test.

19. The system of claim 11, wherein the end user device is further programmed to:
generate a completion code responsive to a determination that a corresponding audio recording has been generated for each one of one or more utterances, wherein the completion code is configured to provide information that validates the one or more utterances have been uttered and recorded.

20. The system of claim 11, wherein to cause the audio recording to be provided to a remote device via a network, the end user device is further programmed to:
immediately upload the audio recording to the remote device instead of through a batch process.

* * * * *